US009873777B2

(12) United States Patent
Kiriyama et al.

(10) Patent No.: US 9,873,777 B2
(45) Date of Patent: Jan. 23, 2018

(54) CARBON FIBER BUNDLE AND METHOD OF PRODUCING CARBON FIBERS

(71) Applicant: Mitsubishi Rayon Co., Ltd., Tokyo (JP)

(72) Inventors: Takayuki Kiriyama, Toyohashi (JP); Naoki Sugiura, Toyohashi (JP); Masahiro Hata, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 284 days.

(21) Appl. No.: 14/395,185

(22) PCT Filed: Apr. 18, 2013

(86) PCT No.: PCT/JP2013/061535
§ 371 (c)(1),
(2) Date: Oct. 17, 2014

(87) PCT Pub. No.: WO2013/157612
PCT Pub. Date: Oct. 24, 2013

(65) Prior Publication Data

US 2015/0094401 A1 Apr. 2, 2015

(30) Foreign Application Priority Data

Apr. 18, 2012 (JP) ................................ 2012-094551

(51) Int. Cl.
*C08K 7/06* (2006.01)
*D01F 9/22* (2006.01)
*D01F 6/38* (2006.01)
*C08K 3/04* (2006.01)

(52) U.S. Cl.
CPC ................. *C08K 7/06* (2013.01); *D01F 6/38* (2013.01); *D01F 9/22* (2013.01); *D01F 9/225* (2013.01); *C08K 3/046* (2017.05); *C08K 2201/002* (2013.01)

(58) Field of Classification Search
None
See application file for complete search history.

(56) References Cited

U.S. PATENT DOCUMENTS 4,347,279 A 8/1982 Saji et al.
6,103,211 A 8/2000 Matsuhisa et al.
6,221,490 B1 4/2001 Matsuhisa et al.
2001/0024722 A1 9/2001 Matsuhisa et al.
2002/0009588 A1 1/2002 Matsuhisa et al.
2013/0295811 A1 11/2013 Shinmen et al.

FOREIGN PATENT DOCUMENTS

EP 0843033 A1 5/1998
JP H09-31758 A 2/1997
JP 11-124743 A 5/1999
JP 2004-300600 A 10/2004
JP 2004300600 A * 10/2004
JP 2008-202207 A 9/2008
JP 2011-046942 A 3/2011
WO 97/45576 A1 12/1997
WO 2012/050171 A1 4/2012

OTHER PUBLICATIONS

Extended European Search Report issued in counterpart European Patent Application No. 13778358.5 dated Mar. 20, 2015.
International Search Report issued in corresponding International Patent Application No. PCT/JP2013/061535 dated Jun. 18, 2013.
Written Opinion issued in corresponding International Patent Application No. PCT/JP2013/061535 dated Jun. 18, 2013.
Minus et al., "The Processing, Properties, and Structure of Carbon Fibers," The Journal of the Minerals, Metals & Materials Society, 52-58 (2005).
Endo, "Certificate of Experimental Results," Toray Industries, Inc., Ehime Plant, Feb. 8, 2016.
Third Party Observations issued in corresponding European Patent Application No. 13778358.5 dated Apr. 5, 2016.
Experimental determination of relationship between the methods of JIS-R-7601 and ASTM D4018.

* cited by examiner

*Primary Examiner* — Richard A Huhn
(74) *Attorney, Agent, or Firm* — Morgan, Lewis & Bockius LLP

(57) ABSTRACT

Provided are carbon fibers which have a thicker single fiber fineness of the polyacrylonitrile-based precursor fiber bundles and lower production costs, and which have excellent mechanical properties. Also provided are: carbon fiber bundles having a single fiber fineness of 0.8-2.1 dtex, a strand strength of 4.9 GPa or greater, and a strand elastic modulus of 200 GPa or greater; carbon fiber bundles having a single fiber fineness of 0.8-2.5 dtex, a strand strength of 3.0 GPa or greater, and a strand elastic modulus of 240 GPa or greater; and an optimal method for producing said carbon fiber bundles. carbon fiber bundles having a single fiber fineness of 0.8-2.5 dtex, a strand strength of 3.0 GPa or greater, and a strand elastic modulus of 240 GPa or greater; and an optimal method for producing said carbon fiber bundles.

22 Claims, No Drawings

CARBON FIBER BUNDLE AND METHOD OF PRODUCING CARBON FIBERS

TECHNICAL FIELD

The present invention relates to a carbon fiber bundle, production method thereof, as well as a composite material using carbon fiber bundles.

BACKGROUND ART

Methods of producing carbon fiber bundles from polyacrylonitrile-based precursor fiber bundles with a polymer in which acrylonitrile is the main component as a raw material are widely known, and are produced by first flameproofing at 200 to 300° C. in air or another oxidizing gas atmosphere to make a flameproof fiber bundle, and then carbonizing this at 800 to 2,000° C. in an inert gas atmosphere such as nitrogen or argon. In addition, graphitization is further performed in an inert gas atmosphere of at least 2,000° C., and producing graphite fiber bundles of much higher modulus of elasticity has been taking place.

With the object of efficiently producing and providing high-quality, high-performance carbon fiber bundles, a carbon fiber bundle is proposed having a strand strength of at least 389 kgf/mm$^2$, made by calcining an acrylic precursor fiber bundle constituted from a copolymer made by copolymerizing 1 to 10% of a specific polymerizable unsaturated carboxylic acid alkyl ester and 0.25 to 5% of a specific polymerizable unsaturated carboxylic acid, and having a single thread inner/outer oxygen concentration ratio obtained by secondary ion mass spectrometry (SIMS) of no more than 6, or H/C of the inner layer of no more than 0.03, after flameproofing for 5 minutes at 260° C., further for 5 minutes at 280° C. in air at ambient pressure. The Examples propose carbon fiber bundles having a strand strength of 501 kgf/mm$^2$ and strand modulus of elasticity of 26 tonf/mm$^2$ with carbon fiber bundles from flameproofing, using 2.0 denier polyacrylonitrile-based precursor fiber bundles produced from a copolymer made from 92.5% acrylonitrile, 1.5% itaconic acid and 6% normal butyl methacrylate, these fibers for 30 minutes in air at 240 to 260° C., and heat treating in a nitrogen flow at up to 1,300° C. This succeeds at the production of carbon fiber bundles having relatively high tensile strength with a flameproofing time of a short time, even with fibers having large relative fineness of single fibers, by causing the flameproofing reactivity to decline by drastically lowering the acrylonitrile ratio.

In addition, Patent Documents 2 and 3 propose a method of efficiently producing thick fineness carbon fiber bundles by spinning a flameproof polymer with polyacrylonitrile-based polymer as a precursor to obtain a flameproof fiber bundle such that the single fiber fineness is at least 2 dtex, followed by carbonization treating this flameproof fiber bundle, and a carbon fiber bundle having a strand tensile strength of at least 4 GPa and strand tensile modulus of elasticity of at least 200 GPa by way of heat treating a polyacrylonitrile-based precursor fiber bundle in the liquid phase to obtain a flameproof fiber bundle, followed by carbonization treating this flameproof fiber bundle.

On the other hand, as a means for increasing the production output in the field of composite fibers, a method has been known of thickening a fiber bundle by increasing the number of fibers or thickening the single fiber fineness, and thus increasing the discharge amount per spinneret. If thickening the fiber bundle in this way, the production output will increase, while due to being related with a cost reduction at the same time due to an increase in cost of equipment being curbed to a minimum, it has been widely used in major industrial fibers such as polyester and nylons (refer to Patent Document 2).

Patent Document 1: Japanese Unexamined Patent Application, Publication No. H09-31758

Patent Document 2: Japanese Unexamined Patent Application, Publication No. 2008-202207

Patent Document 3: Japanese Unexamined Patent Application, Publication No. 2004-300600

DISCLOSURE OF THE INVENTION

Problems to be Solved by the Invention

However, the carbon fiber described in Patent Document 1 does not have sufficient ladder structure formation in the flameproofing treatment due to the acrylonitrile ratio being low at 92.5%, and thus decomposition and gasification occur in the carbonization treatment, and defect hole formation which becomes a cause for the strength of the carbon fiber bundle declining is promoted. For this reason, the production of higher strength carbon fiber bundles is difficult.

For the production methods of carbon fiber bundles described in Patent Documents 2 and 3, since the flameproofing treatment time is a very short time, in the case of the number of single fibers constituting the carbon fiber bundle exceeding 6000, unevenness in the flameproofing treatment between fibers tends to arise, whereby the degree of variability in the modulus of elasticity between fibers of the obtained carbon fiber bundle increases, and thus it is difficult to produce a carbon fiber bundle having high performance and uniform performance.

The present invention has an object of providing carbon fiber bundles superior in mechanical properties, as well as achieving a cost reduction, by thickening the single fiber fineness of a polyacrylonitrile-based precursor fiber bundle. In addition, the present invention has an object of providing a composite material using such carbon fiber bundles.

Means for Solving the Problems

The problems are solved by the following first to eighteenth aspects of the present invention.

According to a first aspect of the present invention, a carbon fiber bundle has a single fiber fineness of the carbon fiber bundle of at least 0.8 dtex to no more than 2.1 dtex, a strand strength obtained by the method of ASTM D4018 of at least 4.9 GPa and a strand modulus of elasticity obtained by the method of at least 200 GPa.

According to a second aspect of the present invention, in the carbon fiber bundle as described in the first aspect, a degree of variability in single fiber modulus of elasticity in a single fiber tension test is no more than 20%.

According to a third aspect of the present invention, a carbon fiber has a single fiber fineness of the carbon fiber bundle of at least 0.8 dtex to no more than 2.5 dtex, a strand strength obtained by the method of ASTM D4018 of at least 3.0 GPa, and a strand modulus of elasticity obtained by the method of at least 240 GPa.

According to a fourth aspect of the present invention, in the carbon fiber bundle as described in the third aspect, a degree of variability in single fiber modulus of elasticity in a single fiber tension test is no more than 20%.

According to a fifth aspect of the present invention, in the carbon fiber bundle as described in the fourth aspect, the strand modulus of elasticity obtained by the method of ASTM D4018 is at least 265 GPa.

According to a sixth aspect of the present invention, in the carbon fiber bundle as described in any one of the first to fifth aspects, the single fiber fineness is at least 1.1 dtex.

According to a seventh aspect of the present invention, in the carbon fiber bundle as described in any one of the first to fifth aspects, the number of single fibers is at least 6,000 to no more than 50,000.

According to an eighth aspect of the present invention, in the carbon fiber bundle as described in the seventh aspect, the number of single fibers is no more than 36,000.

According to a ninth aspect of the present invention, in the carbon fiber bundle as described in any one of the first to fifth aspects, the total fineness is at least 4800 dtex to no more than 56000 dtex.

According to a tenth aspect of the present invention, a method of producing carbon fiber bundles for obtaining the carbon fiber bundle as described in the first or second aspect, includes a heat treatment step of heat treating, for at least 80 minutes to no more than 240 minutes under an oxidizing atmosphere rising in temperature within the temperature range of 220 to 300° C., a polyacrylonitrile-based precursor fiber bundle having a single fiber fineness of at least 1.7 dtex to no more than 4.2 dtex consisting of a polyacrylonitrile-based copolymer containing 96 to 99% by mole of acrylonitrile units and 1 to 4% by mole of hydroxyaklyl methacrylate units, and/or a polyacrylonitrile-based precursor fiber bundle having a single fiber fineness of at least 1.7 dtex to no more than 4.2 dtex having a constant velocity temperature rising exothermic curve of 30° C. to 450° C. measured in an air flow of 100 ml/min that is a flowrate based on 30° C. at 0.10 MPa and at a heating rate of 10° C./min using a heat flux-type differential scanning calorimeter that satisfies conditions (A) and (B) below:

(A) heat amount Ja obtained by integrating the heat generation rate of at least 230° C. to no higher than 260° C. of a constant velocity temperature rising exothermic curve is at least 140 kJ/kg to no more than 200 kJ/kg; and (B) heat amount Jb obtained by integrating the heat generation rate of at least 260° C. to no higher than 290° C. is at least 600 kJ/kg to no more than 1,000 kJ/kg.

According to an eleventh aspect of the present invention, in the method of producing carbon fiber bundles as described in the tenth aspect, a heat treatment time T1 (minutes) in the heat treatment step satisfies condition (C) below:

(C) 140×single fiber fineness (dtex) of polyacrylonitrile-based precursor fiber bundle−100 heat treatment time T1 (minutes)≥140×single fiber fineness (dtex) of polyacrylonitrile-based precursor fiber bundle−270.

According to a twelfth aspect of the present invention, in the method of producing carbon fiber bundles as described in the tenth or eleventh aspect, a carbonization treatment is conducted to heat treat the fiber bundle obtained from the heat treatment step at a highest temperature of 1,000° C. to 1,700° C. under an inert gas atmosphere, so as to make a carbon fiber bundle having a strand strength obtained by the method of ASTM D4018 of at least 4.9 GPa.

According to a thirteenth aspect of the present invention, a method of producing carbon fiber bundles for obtaining the carbon fiber bundle as described in the third or fourth aspect, includes:

a heat treatment step of heat treating, for at least 80 minutes to no more than 240 minutes under an oxidizing atmosphere rising in temperature within the temperature range of 220 to 300° C., a polyacrylonitrile-based precursor fiber bundle having a single fiber fineness of at least 1.7 dtex to no more than 4.6 dtex consisting of a polyacrylonitrile-based copolymer containing 96 to 99% by mole of acrylonitrile units and 1 to 4% by mole of hydroxyaklyl methacrylate units, and/or a polyacrylonitrile-based precursor fiber bundle having a single fiber fineness of at least 1.7 dtex to no more than 4.6 dtex having a constant velocity temperature rising exothermic curve of 30° C. to 450° C. measured in an air flow of 100 ml/min that is a flowrate based on 30° C. at 0.10 MPa and at a heating rate of 10° C./min using a heat flux-type differential scanning calorimeter that satisfies conditions (A) and (B) below:

(A) heat amount Ja obtained by integrating the heat generation rate of at least 230° C. to no higher than 260° C. of a constant velocity temperature rising exothermic curve is at least 140 kJ/kg to no more than 200 kJ/kg;

(B) heat amount Jb obtained by integrating the heat generation rate of at least 260° C. to no higher than 290° C. is at least 600 kJ/kg to no more than 1,000 kJ/kg; and a step of conducting carbonization treatment to heat treat the fiber bundle obtained from the heat treatment step at a highest temperature of at least 1,500° C. under an inert gas atmosphere, so as to make a carbon fiber bundle having a strand modulus of elasticity obtained by the method of ASTM D4018 of at least 240 GPa.

According to a fourteenth aspect of the present invention, in the method of producing carbon fiber bundles as described in the thirteenth aspect, the highest temperature is at least 1,800° C.

According to a fifteenth aspect of the present invention, in the method of producing carbon fiber bundles as described in any one of the tenth to fourteenth aspects, a number of single fibers in the polyacrylonitrile-based precursor fiber bundle is at least 6,000 to no more than 50,000.

According to a sixteenth aspect of the present invention, in the method of producing carbon fiber bundles as described in any one of the tenth to fourteenth aspects, an elongation rate of polyacrylonitrile-based precursor fiber bundles in the heat treatment step is at least −5% to no more than 5%.

According to a seventeenth aspect of the present invention, in the method of producing carbon fiber bundles as described in any one of the tenth to sixteenth aspects, the carbon fiber bundle has a degree of variability in single fiber modulus of elasticity in a single fiber tension test of no more than 20%.

According to an eighteenth aspect of the present invention, a resin-based composite material contains the carbon fiber bundle as described in any one of the first to ninth aspects.

Effects of the Invention

According to the present invention, it is possible to provide carbon fiber bundles superior in mechanical properties, as well as achieving a cost reduction, by thickening the single fiber fineness of a polyacrylonitrile-based precursor fiber bundle. In addition, according to the present invention, a composite material using such carbon fiber bundles is provided.

PREFERRED MODE FOR CARRYING OUT THE INVENTION

In relation to the present invention, the strand strength and strand modulus of elasticity are obtained by the method of ASTM D4018.

According to an aspect of the present invention, a carbon fiber bundle is provided having a single fiber fineness of at least 0.8 dtex to no more than 2.1 dtex, a strand strength of at least 4.9 GPa and a strand modulus of elasticity of at least 200 GPa. In this carbon fiber bundle, it is preferable for the degree of variability in the single fiber modulus of elasticity in a single fiber tensile test to be no more than 20%.

According to another aspect of the present invention, a method of producing the carbon fiber bundle (carbon fiber bundle having a strand strength of at least 4.9 GPa and a strand modulus of elasticity of at least 200 GPa) is provided that includes a heat treatment process (flameproofing process) of heat treating an acrylonitrile-based precursor fiber bundle for at least 80 minutes to no more than 240 minutes under an oxidizing atmosphere that rises in temperature within the temperature range of 220 to 300° C. Herein, as the polyacrylonitrile-based precursor fiber bundle, one type or a plurality of types of polyacrylonitrile-based precursor fiber bundles selected from the group consisting of the polyacrylonitrile-based precursor fiber bundle of ia) and the polyacrylonitrile-based precursor fiber bundle of iia) shown below can be used. A certain type of precursor fiber bundle may fall under both ia) and iia), or may fall under only one of either ia) and iia).

ia) Polyacrylonitrile-based precursor fiber bundle consisting of a polyacrylonitrile-based copolymer of at least 96% by mole to no more than 99% by mole of acrylonitrile units and at least 1% by mole to no more than 4% by mole of hydroxyalkyl methacrylate units. However, the single fiber fineness thereof is at least 1.7 dtex to no more than 4.2 dtex.

iia) Polyacrylonitrile-based precursor fiber bundle for which the constant velocity temperature rising exothermic curve of 30° C. to 450° C. measured in an air flow of 100 ml/min (flowrate basis of 30° C., 0.10 MPa) and heating rate of 10° C./min using a heat flux-type differential scanning calorimeter, satisfies both of the following conditions (A) and (B). However, the single fiber fineness thereof is at least 1.7 dtex to no more than 4.2 dtex:

(A) heat amount Ja obtained by integrating the heat generation rate of at least 230° C. to no higher than 260° C. of a constant velocity temperature rising exothermic curve is at least 140 kJ/kg to no more than 200 kJ/kg; and (B) heat amount Jb obtained by integrating the heat generation rate of at least 260° C. to no higher than 290° C. is at least 600 kJ/kg to no more than 1,000 kJ/kg.

According to another aspect of the present invention, a carbon fiber bundle is provided having a single fiber fineness of at least 0.8 dtex to no more than 2.5 dtex, a strand strength of at least 3.0 GPa and a strand modulus of elasticity of at least 240 GPa. In this carbon fiber bundle, the degree of variability in the single fiber modulus of elasticity in single fiber tensile tests is preferably no more than 20%.

According to another aspect of the present invention, a method of producing the carbon fiber bundle (carbon fiber bundle having a strand strength of at least 3.0 GPa and a strand modulus of elasticity of at least 240 GPa) is provided that includes: a heat treatment process (flameproofing process) of heat treating an acrylonitrile-based precursor fiber bundle for at least 80 minutes to no more than 240 minutes under an oxidizing atmosphere that rises in temperature within the temperature range of 220 to 300° C.; and a step of conducting carbonization treatment to heat treat the fiber bundle obtained from the heat treatment step at a highest temperature of at least 1,500° C. under an inert gas atmosphere, so as to make a carbon fiber bundle having a strand modulus of elasticity of at least 240 GPa. Herein, as the polyacrylonitrile-based precursor fiber bundle, one type or a plurality of types of polyacrylonitrile-based precursor fiber bundles selected from the group consisting of the polyacrylonitrile-based precursor fiber bundle of ib) and the polyacrylonitrile-based precursor fiber bundle of iib) shown below can be used. A certain type of precursor fiber bundle may fall under both ib) and iib), or may fall under only one of either ib) and iib).

ib) polyacrylonitrile-based precursor fiber bundle consisting of polyacrylonitrile-based copolymer containing 96 to 99% by mole of acrylonitrile units and 1 to 4% by mole of hydroxyaklyl methacrylate units. However, the single fiber fineness thereof is at least 1.7 dtex to no more than 4.6 dtex.

iib) Polyacrylonitrile-based precursor fiber bundle for which the constant velocity temperature rising exothermic curve of 30° C. to 450° C. measured in an air flow of 100 ml/min (flowrate basis of 30° C., 0.10 MPa) and heating rate of 10° C./min using a heat flux-type differential scanning calorimeter, satisfies both of the following conditions (A) and (B). However, the single fiber fineness thereof is at least 1.7 dtex to no more than 4.6 dtex:

(A) heat amount Ja obtained by integrating the heat generation rate of at least 230° C. to no higher than 260° C. of a constant velocity temperature rising exothermic curve is at least 140 kJ/kg to no more than 200 kJ/kg; and (B) heat amount Jb obtained by integrating the heat generation rate of at least 260° C. to no higher than 290° C. is at least 600 kJ/kg to no more than 1,000 kJ/kg.

In relation to the present invention, "polyacrylonitrile-based precursor fiber bundle" is a fiber bundle for carbon fiber consisting of a copolymer in which acrylonitrile is a main component. The ratio of acrylonitrile units among the monomer units constituting this polymer, for example, is set to at least 94% by mole, and further, to at least 96% by mole. Hereinafter, the present invention will be explained in detail.

As the polyacrylonitrile-based polymer that can be used as the raw material of the polyacrylonitrile-based precursor fiber bundle that is the raw material of the carbon fiber bundle of the present invention, there are polyacrylonitrile homopolymers or copolymers, or mixtures thereof.

As the copolymer, a copolymer containing hydroxyalkyl methacrylate units is preferable, and the content of hydroxyalkyl methacrylate units in the polyacrylonitrile-based copolymer preferably being 1 to 4% by mole. The carboxylate ester group of the hydroxyalkyl methacrylate units becomes a carboxylic acid group by thermally decomposing at high temperatures of 250° C. or higher. If the content of hydroxyalkyl methacrylate units in the copolymer is at least 1% by mole, a sufficient effect of promoting the flameproofing reaction will be easily obtained upon the carboxylate acid ester group of the hydroxyalkyl methacrylate unit becoming a carboxylic acid group in the flameproofing process. On the other hand, if no more than 4% by mole, it is easily possible to suppress runaway of the flameproofing reaction. Furthermore, suppressing a decline in the carbonization yield accompanying the detachment of the hydroxyalkyl group in the flameproofing process is easy.

The lower limit for the content of the hydroxyalkyl methacrylate units is preferably at least 1.2% by mole from the viewpoint of compactness securement of the polyacrylonitrile-based precursor fiber bundle (hereinafter referred to as "precursor fiber bundle" as appropriate), and is more preferably at least 1.5% by mole in the point of higher performance carbon fiber being obtained. In addition, the upper limit for the content of hydroxyalkyl methacrylate units is preferably no more than 4.0% by mole from the aspect of suppressing runaway reaction in the flameproofing process, and is more preferably no more than 3.0% by mole in the aspect of suppress a decline in the carbonization yield.

As the hydroxyalkyl methacrylate serving as the raw material of the hydroxyalkyl methacrylate units, 2-hydroxyethyl methacrylate, 2-hydroxypropyl methacrylate, 4-hydroxybutyl methacrylate, monoglyceryl methacrylate and tetrahydrofurfuryl methacrylate can be exemplified. Furthermore, these hydroxyalkyl methacrylates may be jointly used.

2-Hydroxyethyl methacrylate is suitable as a constituent element of the copolymer used in the present invention in the aspects of the detachment temperature of the hydroxyethyl group in the flameproofing process being at least 240° C., having sufficient bulk in the improvement of oxygen permeability, the decrease in mass when the hydroxyethyl group detaches being small, being easily obtained industrially, etc.

The polyacrylonitrile-based copolymer contains acrylonitrile units and hydroxyalkyl methacrylate units; however, it may contain other monomer units as necessary. Alternatively, the polyacrylonitrile-based copolymer may consist of acrylonitrile units and hydroxyalkyl methacrylate units. In place of the hydroxyalkyl methacrylate units, for example, it is possible to use hydroxyalkyl acrylate units.

As the other monomer, a vinyl-based monomer that can copolymerize with acrylonitrile is preferable. More specifically, ester (meth)acrylates such as methyl (meth)acrylate, ethyl (meth)acrylate, propyl (meth)acrylate, butyl (meth) acrylate and hexyl (meth)acrylate; halogenated vinyls such as vinyl chloride, vinyl bromide and vinylidene chloride; acids such as (meth)acrylic acid, itaconic acid and crotonic acid and salts of these; maleic acid imide, phenylmaleimide, (meth)acrylamide, styrene, α-methylstyrene, vinyl acetate, etc. can be exemplified. These may be used individually, or two or more types may be jointly used.

The content of the other monomer in the copolymer is preferably no more than 3.0% by mole considering the contents of acrylonitrile units and hydroxyalkyl methacrylate units.

As a polymerization method for obtaining an acrylonitrile-based polymer that can be used as a raw material of the polyacrylonitrile-based precursor fiber bundle that is the raw material of the carbon fiber bundle of the present invention, although redox polymerization in an aqueous solution, suspension polymerization in a heterogeneous system, emulsion polymerization using a dispersant, etc. can be exemplified, for example, it is not limited thereto.

In general, the polyacrylonitrile-based precursor fiber bundle for carbon fiber bundles is produced by obtaining a coagulated thread by discharging a spinning dope of 15 to 30% by mass polymer concentration obtained by dissolving polyacrylonitrile-based polymer in a solvent into a coagulation bath at a temperature of 20 to 50° C. consisting of an aqueous solution of 30 to 70% by mass solvent concentration, then drawing this coagulated thread. Hereinafter, the spinning method is explained.

<Preparation of Spinning Dope>

The aforementioned polymer is dissolved by a conventional method into a solvent, and defined as a spinning dope. As the solvent, organic solvents such as dimethylacetamide, dimethylsulfoxide and dimethylformamide, and aqueous solutions of inorganic compounds such as zinc chloride and sodium thiocyanic acid can be used. An organic solvent is preferable from the aspects of not containing metals in the precursor fiber bundle and the process being simplified, and thereamong, it is preferable to use dimethylacetamide in the aspect of the compactness of the precursor fiber bundle being high.

<Coagulation>

The spinning dope preferably has a polymer concentration of at least a certain extent in order to obtain a compact coagulated thread, and so as to have suitable viscosity and fluidity. The concentration of polymer in the spinning dope is preferably in the range of 15 to 30% by mass, and is more preferably in the range of 18 to 25% by mass. As the coagulation bath liquid, an aqueous solution of the same solvent as a general spinning dope is used. In this case, water functions as a poor solvent of the polymer.

As the spinning method of the acrylonitrile-based precursor fiber bundle of the carbon fiber bundle obtained in the present invention, a conventional method can be adopted, and more specifically, a wet spinning method, wet-dry spinning method, dry spinning method, etc. can be exemplified. Thereamong, a wet spinning method is preferably used from the viewpoint of productivity.

A coagulated thread can be obtained by discharging the above-mentioned spinning dope into a coagulation bath via a spinneret and spinning. The coagulation bath conditions are important to obtain a compact structure required in the precursor fiber for carbon fibers and in order to ensure the coagulability to enable high productivity. As the coagulation bath conditions, a solvent concentration of at least 30% by mass to no more than 70% by mass, and a temperature of at least 20° C. to no higher than 50° C. are preferable. If the coagulation bath conditions are within these ranges, it will be possible to obtain a precursor fiber bundle while keeping a suitable coagulation rate. In addition, the roundness of a single fiber of the precursor fiber bundle described later can be controlled in the coagulation process of the spinning process.

If the solvent concentration in the coagulation bath is no more than 70% by mass, the exchange velocity between the solvent and water at the surface of the spinning dope discharged into the coagulation bath surpasses the diffusion rate of water into the spinning dope, and compact precursor fibers can be easily obtained, and further, the adherence between single fibers in the precursor fiber bundle can be easily suppressed. In particular, upon spinning the precursor fiber bundle for which the single fiber fineness and total fineness are both large, the solvent concentration is preferably no more than 67% by mass, and more preferably no more than 50% by mass, from the aspect of further suppressing adherence between single fibers. In addition, if the solvent concentration in the coagulation bath is at least 30% by mass, it is preferable since it is possible to easily suppress the exchange velocity between the solvent and water at the surface of the spinning dope discharged into the coagulation bath from considerably surpassing the diffusion rate of water into the spinning dope, and a compact precursor fiber bundle can be obtained in a range in which sudden shrinkage of the coagulated thread does not occur, and is more preferably at least 35% by mass, and even more preferably at least 40% by mass. The cross-sectional shape of a single fiber in the precursor fiber bundle varies depending on the coagulation bath conditions. If the concentration is in the range from 30% by weight to 70% by weight, the roundness showing the cross-sectional shape is kept within a favorable range for the performance expression and resin impregnation property of the carbon fiber bundle.

On the other hand, if the coagulation bath temperature is no higher than 50° C., it is possible to easily suppress the exchange velocity between solvent and water at the surface of the spinning dope discharged into the coagulation bath from considerably surpassing the dispersion rate of water into the spinning dope, and a compact precursor fiber bundle can be easily obtained in a range in which sudden shrinkage of the coagulated thread does not occur. In addition, if at least 20° C., the exchange velocity between the solvent and water at the surface of the spinning dope discharged into the coagulation bath and the dispersion rate of water into the spinning dope will be kept suitable, and stably producing precursor fiber bundles will become easy. Furthermore, it is not necessary to excessively cool the coagulation bath, and thus the capital investment and running cost can be suppressed, and it becomes possible to produce precursor fiber bundles at low cost. The coagulation bath temperature is preferably at least 25° C., and is more preferably at least 35° C. In addition, the coagulation bath temperature is preferably no higher than 45° C.

The single fiber fineness of the polyacrylonitrile-based precursor fiber bundle of the present invention is preferably at least 1.7 dtex to no more than 4.6 dtex. If at least 1.7 dtex, producing a carbon fiber bundle of the objective strand strength and strand modulus of elasticity will be easy. On the other hand, if the single fiber fineness of the precursor fiber bundle is no more than 4.6 dtex, it becomes possible to stably produce carbon fiber bundles of uniform quality without the cross-sectional two-layer structure becoming obvious in the flameproofing process, and thus carbon fiber bundles having a strand strength of at least 3.0 GPa and a strand modulus of elasticity of at least 240 GPa, which is one of the objects of the present invention, can be easily produced. Furthermore, if the single fiber fineness of the precursor fiber bundle is no more than 4.2 dtex, it is possible to easily obtain a carbon fiber bundle in which the strand strength is at least 4.9 GPa and the strand modulus of elasticity is at least 200 GPa, which is another object of the present invention. The single fiber fineness is preferably at least 1.8 dtex, and more preferably at least 1.9 dtex. In addition, the single fiber fineness is preferably no more than 3.5 dtex, and more preferably no more than 3.0 dtex.

The number of single fibers of the carbon fiber bundle of the present invention is preferably at least 6,000 to no more than 50,000. This is because, if the number of single fibers in the carbon fiber bundle is no more than 50,000, the structural non-uniformity in the cross-sectional direction of the carbon fiber bundle between single fibers arising in the calcination process of carbon fibers will tend to decrease, and sufficient mechanical performance will tend to be expressed. In addition, if at least 6,000 fibers, productivity will tend to be ensured. The number of fibers in the carbon fiber bundle is preferably at least 9,000 to no more than 36,000, and is more preferably at least 12,000 to no more than 30,000. In addition, in a case of the single fiber fineness of the polyacrylonitrile-based precursor fiber bundle exceeding 3.1 dtex, not exceeding 110,000 dtex as a total fineness is preferable in the aspect of decreasing the structural non-uniformity in the cross-sectional direction of the carbon fiber bundle between single fibers.

Next, the production method of carbon fibers of the present invention will be explained. First, the polyacrylonitrile-based precursor fiber bundle is flameproofing treated at a temperature of at least 220° C. to no higher than 300° C. under an oxidizing atmosphere to make a flameproof fiber bundle. It should be noted that, in the present invention, "under an oxidizing atmosphere" indicates in air containing oxidizing substances such as nitrogen dioxide, sulfur dioxide and oxygen.

The flameproofing treatment time is preferably 80 to 240 minutes. If the flameproofing treatment time is at least 80 minutes, it is easy to sufficiently carry out diffusion of oxygen to inside of a single fiber constituting the precursor fiber bundle, and thus, depending on the heat treatment conditions in the carbonization process thereafter, it is easily possible to obtain a carbon fiber bundle having a strand strength of at least 4.9 GPa or a carbonized fiber bundle having a strand modulus of elasticity of at least 240 GPa. By taking time for flameproofing treatment, it is easy to flameproof up to inside of the fiber bundle. In addition, if the flameproofing treatment time is no more than 240 minutes, producing carbon fiber bundles efficiently will be possible, without the flameproofing treatment process in the production process of carbon fiber bundles becoming a cause harming the productivity. The flameproofing time is more preferably at least 85 minutes to no more than 220 minutes, and even more preferably at least 95 minutes to no more than 200 minutes.

Furthermore, if the flameproofing treatment time is the heat treatment time T1 (minutes) satisfying condition (C) below, it will tend to be possible to obtain a carbon fiber bundle having a strand strength of at least 4.9 GPa and strand modulus of elasticity of at least 200 GPa, which is one of the aspects of the present invention.

(C) 140×single fiber fineness (dtex) of polyacrylonitrile-based precursor fiber bundle−100 heat treatment time T1 (minutes)≥140×single fiber fineness (dtex) of polyacrylonitrile-based precursor fiber bundle−270.

With the present invention, in the course from the start of the flameproofing treatment until the flameproofing treatment ends, if the elongation rate of the polyacrylonitrile-based precursor fiber bundle is at least −5% to no more than 5%, sufficient strength tends to be realized without the grade of carbon fiber bundle, particularly the strand strength, declining. In addition, if the elongation rate at this time is at least −5% to no more than 5%, it is easy to perform production of flameproof fiber bundles stably without thread breakage, etc. occurring. When the fineness is thick, the elongation rate is preferably at least 0%, and more preferably at least 3%, from the viewpoint of strength expressability.

<Heat Amounts Ja, Jb of Constant Velocity Temperature Rising Exothermic Curve>

In the present invention, the polyacrylonitrile-based precursor fiber bundle preferably has a constant velocity temperature rising exothermic curve from 30° C. to 450° C. that satisfies the following conditions when measured in an air flow of 100 ml/min (basis: 30° C., 0.10 MPa) and heating rate of 10° C./min using a heat flux-type differential scanning calorimeter.

(Conditions):

(A) heat amount Ja obtained by integrating the heat generation rate of at least 230° C. to no higher than 260° C. of a constant velocity temperature rising exothermic curve is at least 140 kJ/kg to no more than 200 kJ/kg; and (B) heat amount Jb obtained by integrating the heat generation rate of at least 260° C. to no higher than 290° C. is at least 600 kJ/kg to no more than 1,000 kJ/kg. The aforementioned constant velocity temperature rising exothermic curve shows the heat amount generating when the flameproofing reaction advances in the precursor fiber bundle.

It should be noted that, upon producing carbon fiber bundles, in the flameproofing process obtaining flameproof fiber bundles from the precursor fiber bundle, the initial treatment temperature thereof is set within the range of a temperature of at least the temperature at which the flameproofing reaction is initiated, and a temperature no higher than the temperature at which the precursor fiber bundle melts. On the other hand, so long as the flameproofing reaction progresses to a certain extent, it is possible to set to a higher treatment temperature in order to efficiently perform flameproofing treatment. In general, since the precursor fiber bundle is flameproofing treated in the temperature region from 220° C. to 300° C., the present inventors, etc. divided this temperature region around 260° C. into the two temperature regions of a flameproofing process first half and a flameproofing process second half, defining the heat generation of 230° C. to 260° C. as heat amount Ja and defining the heat generation of 260° C. to 290° C. as heat amount Jb, and compared the quality and performance of carbon fiber bundles ultimately obtained between the heat generations of the respective temperature regions.

As a result thereof, in the case of the heat amount Ja and heat amount Jb being in the above-mentioned ranges, it was found that the flameproofing reaction and oxygen diffusion was carried out with good balance, the cross-sectional two-layered structure of flameproof fibers in the high-speed flameproofing treatment was suppressed, carbon fiber bundles of high quality and favorable performance expressability were efficiently obtained, and a precursor fiber bundle having large single fiber fineness could be uniformly flameproofing treated. It should be noted that, regarding the flameproofing treatment temperature upon producing actual carbon fiber bundles, due to being influenced by the equipment used and treatment time, the temperature setting during the flameproofing treatment raises the temperature to within the range of 220 to 300° C., and should be an optimum temperature setting in order to flameproofing treat the precursor fiber bundle.

In other words, if the heat amount Ja is at least 140 kJ/kg, the flameproofing reaction moderately progresses in the flameproofing process first half, and the precursor fiber bundle tends to pass through the process without melting by the heat. In addition, if Ja is no more than 200 kJ/kg, in the flameproofing process first half, even a precursor fiber bundle of large single fiber fineness tends to be uniformly flameproofing treated without the flameproofing reaction progressing right away. The heat amount Ja is more preferably at least 150 kJ/kg from the viewpoint of productivity, while it is more preferably no more than 190 kJ/kg from the viewpoint of more uniformly flameproofing treating precursor fiber bundles of large single fiber fineness, and particularly preferably no more than 180 kJ/kg.

On the other hand, if the heat amount Jb is at least 600 kJ/kg, the precursor fiber bundle tends to be flameproofing treated to the target density of the flameproof fibers without harming the productivity in the flameproofing process. In addition, if no more than 1,000 kJ/kg, since the flameproofing reaction will slowly progress in the flameproofing process, a precursor fiber bundle of large single fiber fineness will tend to be uniformly flameproof treated, and the formation of cross-sectional two-layered structure will tend to be suppressed. The heat amount Jb is preferably at least 620 kJ/kg from the viewpoint of a productivity improvement, and is more preferably at least 640 kJ/kg from the viewpoint of a further productivity improvement. In addition, it is preferably no more than 900 kJ/kg from the viewpoint of more uniformly flameproofing treating precursor fiber bundles of large single fiber fineness.

In view of the above, it was found that the heat amount Ja can be set as an index of the flameproofing reactivity in the flameproofing process first half, and the heat amount Jb can be set as an index of the flameproofing reactivity in the flameproofing process second half. It should be noted that the heat amount Ja and heat amount Jb can consistently be set as indices of the flameproofing reactivity of precursor fiber bundles, and the treatment temperature region adopted in the actual flameproofing process may or may not include the temperature region of the heat amount Ja or heat amount Jb (i.e. 230 to 260° C. or 260 to 290° C.), and can be appropriately adjusted in the range of 220 to 300° C. depending on the precursor fiber bundle used, equipment used, and treatment time.

In addition, a flameproof fiber having the heat amount Ja obtained by integrating the heat generation rate of 230° C. to 260° C. on the constant velocity temperature rising exothermic curve of at least 140 kJ/kg to no more than 200 kJ/kg and a heat amount Jb obtained by integrating the heat generation rate of 260° C. to 290° C. of at least 600 kJ/kg to no more than 1,000 kJ/kg has little internal-external structural difference in the single fibers thereof, and when calcining this flameproof thread, a homogeneous carbon fiber is easily obtained as a single fiber.

The density of the flameproof fiber bundle obtained by the flameproofing treatment is preferably 1.34 to 1.43 g/cm$^3$. If at least 1.34 g/cm$^3$, it will be easy to produce carbon fiber bundles without causing the yield of carbon fiber bundles to decline. In general, although the yield of carbon fiber bundles increases as the density of flameproof fibers rises, the performance of the carbon fiber bundle is known to decline, and if the density of flameproof fiber bundles is no more than 1.43 g/cm$^3$, the performance decline of the carbon fiber bundle is suppressed, and it is easy to increase the yield of obtained carbon fiber bundles. From the viewpoint of performance maintenance and yield increase of the obtained carbon fiber bundles, the density of flameproof fiber bundles is more preferably 1.34 to 1.38 g/cm$^3$.

In the segment receiving flameproofing treatment, when the rate at which fibers are introduced to this segment is defined as A, and the rate at which fibers subjected to flameproofing treatment are lead out from this segment defined as B, the elongation rate is calculated by formula (1) below:

$$\text{Elongation rate (\%)}=(A-B)/A\times100 \qquad \text{Formula (1).}$$

A carbon fiber bundle can be obtained by carbonizing the fiber bundle obtained from the flameproofing process. After the flameproofing treatment and before the carbonization treatment, it is possible to perform a pre-carbonization treatment that treats the flameproof fiber bundle obtained at a highest temperature that is a temperature of at least 550° C. to no higher than 800° C. in inert gas.

A carbon fiber bundle can be produced by carbonization treating the obtained flameproof fiber bundle at a temperature of at least 800° C. to no higher than 2,800° C. in inert gas. Setting of the temperature sets according to the desired mechanical properties of the carbon fiber bundle. In order to obtain a carbon fiber bundle having a strand strength of at least 4.9 GPa and a strand modulus of elasticity of at least 200 GPa, which is one of the objects of the present invention, it is better for the highest temperature of carbonization treatment to be low, and is preferably at least 1,000° C. to no higher than 1,700° C. From the viewpoint of mechanical properties, it is preferably at least 1,100° C. to no higher than 1,600° C., and more preferably at least 1,200° C. to no higher than 1,400° C. In addition, since the modulus of elasticity can be raised by lengthening the treatment time, it is possible to lower the highest temperature as a result thereof. Furthermore, by lengthening the treatment time, it becomes possible to gently set the temperature gradient, and there is an effect of suppressing defective spot formation. Although there is no particular limitation for the temperature gradient, a linear gradient is preferably set.

In addition, in order to obtain a carbon fiber bundle having a strand strength of at least 3.0 GPa and a strand modulus of elasticity of at least 240 GPa, which is another one of the objects of the present invention, it is preferable to carbonization treat with the highest temperature of the carbonization temperature of at least 1,500° C. Furthermore, in order to obtain a carbon fiber bundle having a strand strength of at least 3.0 GPa and a strand modulus of elasticity of at least 265 GPa, it is preferable for the highest temperature to be at least 1,800° C., and more preferably at least 2,200° C.

In the case of manufacturing a composite material using the carbon fiber bundles of the present invention, a surface treatment may be performed prior to the sizing treatment process. For example, it is preferable to improve the affinity and adhesiveness between the carbon fiber bundles and matrix resin of the composite material by conducting an electrolytic oxidation treatment in electrolyte, or conducting oxidation treatment in the gas phase of liquid phase.

As the main component of the sizing agent in the sizing treatment liquid, an epoxy resin, epoxy-modified polyurethane resin, polyester resin, phenol resin, polyamide resin, polyurethane resin, polycarbonate resin, polyetherimide resin, polyamideimide resin, polyimide resin, bismaleimide resin, urethane-modified epoxy resin, polyvinyl alcohol resin, polyvinylpyrrolidone resin, polyethersulfone resin, etc. can be exemplified, and is not particularly limited.

The content of sizing agent in the sizing treatment liquid is not particularly limited, and 0.2 to 20% by mass is preferable, and 3 to 10% by mass is more preferable. By setting the content of sizing agent in the sizing treatment liquid to at least 0.2% by mass, it is easy to sufficiently impart the desired function to the carbon fiber bundle. In addition, by setting the content of the sizing agent in the sizing treatment liquid to no more than 20% by mass, the coating amount of the sizing agent becomes preferable, and the impregnating ability of the matrix resin into the carbon fiber bundle upon producing a composite material, which is a subsequent process, easily becomes favorable.

Although the solvent or dispersing medium used in the sizing treatment liquid is not particularly limited, it is preferable to use water from the aspect of handling characteristics and stability.

The coating amount of the sizing agent relative to 100% by mass of the carbon fiber bundle is preferably 0.3 to 5% by mass, and more preferably 0.4 to 3% by mass. By setting the coating amount of the sizing agent to at least 0.3% by weight, it becomes easy to sufficiently impart the desired function to the carbon fiber bundle. In addition, by setting the coating amount of the sizing agent to no more than 3% by mass, the impregnation ability of the matrix resin into the carbon fiber bundle upon manufacturing the processed composite material easily becomes favorable.

In the drying treatment after the sizing treatment, the solvent or dispersing medium of the sizing treatment liquid is removed by drying. For the conditions at this time, the range of temperature of 120 to 300° C. and 10 seconds to 10 minutes is suitable, and the range of temperature of 150 to 250° C. and 30 seconds to 4 minutes is more suitable. By setting the drying temperature to at least 120° C., the solvent can be sufficiently removed easily. In addition, by setting the drying temperature to no higher than 300° C., the quality of the sizing treated carbon fiber bundle can be easily maintained.

The method of the drying treatment is not particularly limited and, for example, a method of drying by contacting the carbon fiber bundle with a hot roller with steam as the heat source, and a method of drying the carbon fiber bundle in an apparatus in which hot air circulates can be exemplified.

In general, if a carbon fiber bundle having a strand strength of at least 3.0 GPa and a strand modulus of elasticity of at least 200 GPa, application to many existing composite materials is possible; however, for a carbon fiber bundle having a strand strength of at least 4.9 GPa, it becomes possible to apply in uses such as pressurized vessels for which high strength of carbon fiber bundles is required, and thus is more suited as a carbon fiber bundle material. For this reason, the strand strength is preferably at least 5.0 GPa, and more preferably at least 5.1 GPa. In addition, if a carbon fiber bundle having a strand modulus of elasticity of at least 240 GPa, it is possible to decrease the blending ratio of fibers in the composite material such as a structural material of windmill wings for which the rigidity of the material is required, and is suited in the aspects of material cost and size reduction. Furthermore, it is more preferable if the strand modulus of elasticity is at least 265 GPa.

For a carbon fiber bundle having a strand strength of at least 4.9 GPa and a strand modulus of elasticity of at least 200 GPa of the present invention, the single fiber fineness of the carbon fiber bundle is in the range of 0.8 to 2.1 dtex, from the limitation of the single fiber fineness of the aforementioned polyacrylonitrile-based precursor fiber bundle. When the average single fiber fineness is the range of 0.8 to 2.1 dtex, a high strength carbon fiber bundle tends to be obtained even when thickening the relative single fiber fineness. In addition, it is preferable since the problem of the oxygen permeability declining and the problem of the defect existence probability increasing and strength of carbon fiber declining tending to be suppressed. From the viewpoint of mechanical properties, the single fiber fineness of the carbon fiber bundle having a strand strength of at least 4.9 GPa and a strand modulus of elasticity of at least 200 Gpa is preferably at least 0.90 dtex to no more than 1.8 dtex, and more preferably at least 1.0 dtex to no more than 1.4 dtex.

For a carbon fiber bundle having a strand strength of at least 3.0 GPa and a strand modulus of elasticity of at least 240 GPa of the present invention, the single fiber fineness of the carbon fiber bundle is in the range of 0.8 to 2.5 dtex, from the limitation of the single fiber fineness of the aforementioned polyacrylonitrile-based precursor fiber bundle. When the average single fiber fineness is the range of 0.8 to 2.5 dtex, a high modulus of elasticity carbon fiber bundle tends to be obtained even when thickening the relative single fiber fineness. In addition, it is preferable since the problem of the oxygen permeability declining and the problem of the defect existence probability increasing and strength of carbon fiber declining tending to be suppressed. The single fiber fineness of the carbon fiber bundle having a strand strength of at least 3.0 GPa and a strand modulus of elasticity of at least 240 Gpa is preferably at least 0.90 dtex to no more than 2.3 dtex, and more preferably at least 1.0 dtex to no more than 1.8 dtex.

In the case of the single fiber fineness of a polyacrylonitrile-based precursor fiber bundle being at least 1.7 dtex, and the number of single fibers constituting the precursor fiber bundle exceeding 6,000, unevenness between fibers tends to arise in the flameproofing treatment, and the degree of variability in the modulus of elasticity between fibers of the obtained carbon fiber bundle increases; however, according to the present invention, it is possible to obtain a carbon fiber bundle having a degree of variability in the single fiber modulus of elasticity in single fiber tension tests of no more than 20%, by way of a method of production using one type or a plurality of types of polyacrylonitrile-based precursor fiber bundles selected from the group consisting of the aforementioned ib) polyacrylonitrile-based precursor fiber bundle and iib) polyacrylonitrile-based precursor fiber bundle, as the polyacrylonitrile-based precursor fiber bundles in the method of producing carbon fiber bundles including a heat treatment step (flameproofing process) of heat treating polyacrylonitrile-based precursor fiber bundles for at least 80 minutes to no more than 240 minutes under an oxidizing atmosphere rising in temperature within the temperature range of 220 to 300° C.

In addition, the cross-sectional shape of a single fiber in the carbon fiber bundle of the present invention is not particularly limited, and may be any of a circular shape, elliptical shape and fava bean shape. Herein, the roundness is adopted as an index expressing the cross-sectional shape of a single fiber in the present invention. The roundness is a value obtained with Formula (2) below, in which S and L are respectively the cross-sectional area and perimeter of a single fiber obtained by SEM observation and image analysis of a cross section perpendicular to the fiber axis of a single fiber.

$$\text{Roundness}=4\pi S/L^2 \qquad (2)$$

The roundness of a circle is 1.00, and this numerical value becomes smaller as the shape deviates from a circle. Therefore, the roundness of an elliptical shape and fava bean shape is smaller than 1.00 and, for example, in an elliptical shape, the numerical value becomes even smaller if the ratio between the major axis and minor axis thereof is larger. In addition, the cross-sectional shape of a single fiber in the precursor fiber bundle approximately matches the cross-sectional shape of a single fiber in the carbon fiber bundle; therefore, it can be considered as a shape derived from the precursor fiber. As a production process that greatly affects the cross-sectional shape determination of a single fiber, there is the coagulation process. In the case of the solvent concentration in the coagulation bath liquid being high, since the coagulation rate will be relatively slow, it is possible to obtain a precursor fiber bundle having high roundness and a compact structure. On the other hand, in the case of the solvent concentration of the coagulation bath temperature being low, since the coagulation rate will be relatively fast, a precursor fiber bundle having low roundness and a sparse structure will be obtained. Generally, in the case of the structure of the precursor fiber bundle being compact, a carbon fiber bundle of high strength tends to be obtained.

In the flameproofing process, in the case of the roundness being high, convergence as a precursor fiber bundle is high, and unevenness arises in the oxygen introduction amount between single fibers constituting as a fiber bundle, and further, the heat generation will partially be stored accompanying the flameproofing reaction, and there is a tendency for portions reaching high temperatures locally to occur. In addition, in the respective single fibers, there is a strong tendency for the oxygen diffusion to the central part to be insufficient, and it is difficult for the flameproofing reaction to sufficiently progress. As a result thereof, single thread breakage and nap occurrence is frequent in the carbonization process, the processability is poor, and there is a tendency for a decline in strength and appearance of the obtained carbon fiber bundle to occur. Therefore, in the calcination of a precursor fiber bundle of high roundness, it is desirable to make a scheme such as lengthening the treatment time of the carbonizing process. From the viewpoint of performance expression of a composite material with resin, carbon fiber bundles with low roundness have large gaps between single fibers, a result of which the impregnation ability of resin can be made more superior. Therefore, compositing with resin is easy, and a composite material of higher performance can be obtained. On the other hand, since carbon fiber of high roundness has high rotation symmetry of shape, in comparison with carbon fiber having the same fineness, the lowest rigidity value of a cross-sectional two-dimensional moment is the largest, and the straightness as a single fiber is higher. As a result thereof, it comes to excel in strength expressability.

In the above way, there are positive aspects and negative aspects in the influence of cross-sectional shape on the ease of production, performance expressability and moldability of carbon fiber. Therefore, the cross-sectional shape of precursor fibers can be selected depending on the intended characteristics or performance of a composite material. The preferred cross-sectional shape of single fibers of a carbon fiber bundle has a roundness of at least 0.70 to no more than 0.99. If the roundness is at least 0.70, compactness of the precursor fiber bundle tends to be obtained, and there is a strong tendency for a high strength carbon fiber bundle to easily be obtained. If no more than 0.99, the oxygen diffusivity to the inside of the fiber bundle, and further, to the inside of a single fiber, tends to reach a sufficient level in the flameproofing process. A more preferable range is at least 0.79 to no more than 0.98.

EXAMPLES

Although the present invention will be explained in further detail by showing Examples in the following, the present invention is not to be limited in any way by these Examples, etc.

<Measurement of Strand Strength and Strand Modulus of Elasticity>

The strand strength and strand modulus of elasticity measured the tensile properties of epoxy resin impregnated strands based on the method of ASTM D4018.

<Degree of Variability in Single Fiber Modulus of Elasticity in Single Fiber Tension Test>

One single fiber was extracted from a carbon fiber bundle, and the modulus of elasticity of the single fiber was measured at test conditions of 5 mm sample length, tension rate of 0.5 mm/min using a universal tester (Instron 5500 (trade name) manufactured by Instron), and this was repeatedly performed until the test results of 100 fibers were obtained from the same carbon fiber bundle sample, the degree of variability was obtained following the below formula from the average value and standard deviation of the modulus of elasticity obtained from the 100 fiber test results:

$$\text{Degree of variability (\%)}=(\text{standard deviation}/\text{average value})\times 100$$

and this was defined as the modulus of elasticity degree of variability between fibers (degree of variability of single fiber modulus of elasticity in single fiber tension test). In addition, concerning the cross-sectional area of carbon fibers used in the calculation of modulus of elasticity, it was calculated according to the following formula from the density of the carbon fiber bundle and the single fiber fineness of the carbon fiber:

Cross-sectional area of carbon fiber=single fiber fineness of carbon fiber (mass per unit length)/density of carbon fiber bundle.

<Roundness of Single Fibers in Carbon Fiber Bundle>

(1) Preparation of Sample

A carbon fiber bundle cut to a length of 5 cm was embedded in epoxy resin (Epomount base resin:Epomount hardener=100:9 (mass ratio)), then cut to 2 cm to expose a cross section, and mirror surface processed.

(2) Etching Process of Observed Face

Furthermore, in order to make the profile of a fiber clear, the cross section of the sample was etching processed by the following method.

Apparatus Used: JEOL, JP-170 (trade name), plasma etching apparatus

Treatment conditions: (atmospheric gas: $Ar/O_2$=75/25 (volume ratio), plasma output: 50 W, vacuum: about 120 Pa, treatment time: 5 min)

(3) SEM Observation

The cross section of the sample obtained by (1) and (2) was observed using an SEM (PHILIPS FEI-XL20 (trade name)), and five photographs in which at least five fiber cross sections were captured on the screen were arbitrarily imaged.

Roundness Measurement of Single Fiber of Carbon Fiber Bundle

Using image analysis software (trade name: Image-Pro PLUS, produced by Nippon Roper K.K.), the profile of the fiber cross sections were traced, and the periphery L and surface area S were measured. Selecting 20 from five photographs arbitrarily, provided that at three fiber cross sections are from one photograph, each sample was measured, and the roundness was calculated according to the formula below:

$$\text{Roundness}=(4\pi S)/L^2.$$

<Constant Velocity Temperature Rising Exothermic Curve of Precursor Fiber Bundle>

The constant velocity temperature rising exothermic curve of the precursor fiber bundle was measured as follows by way of a heat flux-type differential scanning calorimeter. First, the precursor fiber bundle was cut to a length of 4.0 mm, 4.0 mg was precisely weighed, loaded into a 50 µl-hermetically sealed sample container made of Ag manufactured by SII Inc. (trade name: P/N SSC000E030), and was covered by a mesh cover made of Cu manufactured by SII Inc. (trade name: P/N 50-037) (heat treated in air at 450° C. for 15 minutes). Next, it was measured from room temperature (30° C.) to 450° C. at conditions of heating rate of 10° C./min and air supply rate of 100 ml/min (standard of air supply rate: 30° C., 0.10 MPa) using a heat flux-type differential scanning calorimeter: DSC/220 (trade name) manufactured by SII Inc. The heat generation of 230° C. to 260° C. of the obtained constant velocity temperature rising exothermic curve was defined as heat amount Ja, and the heat generation of 260° C. to 290° C. was defined as heat amount Jb.

Example 1

An acrylonitrile-based copolymer consisting of acrylonitrile units/2-hydroxyethyl methacrylate units=98.5/1.5 (mol %) was obtained by copolymerizing under the presence of acrylonitrile, 2-hydroxyethyl methacrylate, ammonium persulfate-ammonium hydrogensulfite and ferric sulfate by way of aqueous suspension polymerization. This polyacrylonitrile-based copolymer was dissolved in dimethylacetoamide to prepare a 21% by mass spinning dope. Through a spinneret with 24,000 holes and a hole diameter of 60 µm (spinning nozzle), the spinning dope was discharged into a coagulation bath consisting of a dimethylacetoamide aqueous solution of 45% by mass concentration at a temperature of 35° C., and received at a rate 0.32 times the discharge linear velocity from the spinneret to obtain a fiber bundle (swollen line of thread). Next, this fiber bundle was drawn to 5.4 times simultaneously with water rinsing, was led to a first oil bath tank consisting of an oil-based treatment liquid in which an oil-based composition of amino-modified silicone/polyoxyethylene(6)lauryl ether=91/9 (mass ratio) had been dispersed in water at a concentration of 1.5% by mass, the oil-based treatment liquid was imparted to the fiber bundle, and after temporarily wringing out with a guide, it was successively led to a second oil bath tank consisting of the same composition and concentration as the first oil bath tank to impart the oil-based treatment liquid to the fiber bundle again. The fiber bundle imparted with the oil-based treatment liquid again was dried using a heated roller, and dry drawing at 1.34 times was done between heated rollers for which the rotational speed was adjusted to predetermined conditions. The overall draw ratio from the swollen line of thread at this time was 7.4 times. Subsequently, the moisture percentage was adjusted by imparting water to the fiber bundle with a touch roller to obtain a precursor fiber bundle with a single fiber fineness of 2.5 dtex.

The above-mentioned precursor fiber bundle was subjected to flameproofing treatment under a temperature distribution of 220 to 260° C. for 107 minutes at an elongation rate of 5% to obtain a flameproof fiber bundle with a density of 1.35 g/cm$^3$. The obtained flameproof fiber bundle was further pre-carbonization treated for 1.4 minutes under a nitrogen atmosphere at 700° C. with an elongation rate of 3.0%, then carbonization treated for 1.0 minute in a nitrogen atmosphere at 1,300° C. with an elongation rate of −4.0% to obtain a carbon fiber bundle. Subsequently, surface treatment was performed on the carbon fiber bundle by way of an electrolytic oxidation method, and thereafter sizing treatment was conducted. The sizing agent used was an aqueous dispersion prepared by mixing 80 parts by mass of “Epikote 828 (trade name)” manufactured by Japan Epoxy Resin Co., Ltd. as a base compound, and 20 parts by mass of “Pluronic F88 (trade name)” manufactured by ADEKA Corp. as an emulsifier, and phase-transfer emulsifying. This sizing agent was adhered at 1% by mass relative to 100% by mass of the carbon fiber bundle, and after passing through the drying process, a carbon fiber bundle was obtained. Upon measuring the strand properties of the obtained carbon fiber bundle, the strand strength was 5.3 GPa and the strand modulus of elasticity was 233 GPa. In addition, the single fiber fineness of the carbon fiber was 1.27 dtex, the degree of variability in the single fiber modulus of elasticity between single fibers was 16.5%, and the roundness was 0.82. Furthermore, the heat amount Ja obtained by heat flux-type differential scanning calorimetry measurement was 170 kJ/kg, and the heat amount Jb was 725 kJ/kg.

Example 2

A carbon fiber bundle was obtained similarly to Example 1, except for copolymerizing under the presence of acrylonitrile, 2-hydroxyethyl methacrylate, ammonium persulfate-ammonium hydrogensulfite and ferric sulfate by way of aqueous suspension polymerization, and setting to acrylonitrile units/2-hydroxyethyl methacrylate units=98.0/2.0 (mol %). Upon measuring the strand properties of the obtained carbon fiber bundle, the strand strength was 5.2 GPa and the strand modulus of elasticity was 233 GPa. In addition, the single fiber fineness of the carbon fiber was 1.26 dtex, the degree of variability in the single fiber modulus of elasticity between single fibers was 13.3%, and the roundness was 0.82. Furthermore, the heat amount Ja obtained by heat flux-type differential scanning calorimetry measurement was 168 kJ/kg, and the heat amount Jb was 722 kJ/kg.

Example 3

A carbon fiber bundle was obtained similarly to Example 1, except for setting the carbonization temperature to 1,550° C. Upon measuring the strand properties of the obtained carbon fiber bundle, the strand strength was 5.1 GPa and the strand modulus of elasticity was 256 GPa. In addition, the single fiber fineness of the carbon fiber was 1.21 dtex, the degree of variability in the single fiber modulus of elasticity between single fibers was 17.2%, and the roundness was 0.82. Furthermore, the heat amount Ja obtained by heat flux-type differential scanning calorimetry measurement was 170 kJ/kg, and the heat amount Jb was 725 kJ/kg.

Example 4

A carbon fiber bundle was obtained similarly to Example 1, except for setting the coagulation bath concentration of 45% by mass, coagulation bath temperature of 25° C. and flameproofing time to 100 minutes. Upon measuring the strand properties of the obtained carbon fiber bundle, the strand strength was 5.3 GPa and the strand modulus of elasticity was 233 GPa. In addition, the single fiber fineness of the carbon fiber was 1.27 dtex, the degree of variability in the single fiber modulus of elasticity between single fibers was 15.2%, and the roundness was 0.79. Furthermore, the heat amount Ja obtained by heat flux-type differential scanning calorimetry measurement was 175 kJ/kg, and the heat amount Jb was 740 kJ/kg.

Example 5

A carbon fiber bundle was obtained similarly to Example 2, except for setting the coagulation bath concentration of 50% by mass and coagulation bath temperature of 35° C. Upon measuring the strand properties of the obtained carbon fiber bundle, the strand strength was 5.3 GPa and the strand modulus of elasticity was 232 GPa. In addition, the single fiber fineness of the carbon fiber was 1.27 dtex, the degree of variability in the single fiber modulus of elasticity between single fibers was 17.0%, and the roundness was 0.86. Furthermore, the heat amount Ja obtained by heat flux-type differential scanning calorimetry measurement was 170 kJ/kg, and the heat amount Jb was 725 kJ/kg.

Example 6

A carbon fiber bundle was obtained similarly to Example 2, except for setting the coagulation bath concentration of 50% by mass and coagulation bath temperature of 40° C. Upon measuring the strand properties of the obtained carbon fiber bundle, the strand strength was 5.2 GPa and the strand modulus of elasticity was 233 GPa. In addition, the single fiber fineness of the carbon fiber was 1.26 dtex, the degree of variability in the single fiber modulus of elasticity between single fibers was 17.3%, and the roundness was 0.88. Furthermore, the heat amount Ja obtained by heat flux-type differential scanning calorimetry measurement was 172 kJ/kg, and the heat amount Jb was 727 kJ/kg.

Example 7

A carbon fiber bundle was obtained similarly to Example 1, except for setting the coagulation bath concentration of 60% by mass and coagulation bath temperature of 45° C. Upon measuring the strand properties of the obtained carbon fiber bundle, the strand strength was 5.2 GPa and the strand modulus of elasticity was 233 GPa. In addition, the single fiber fineness of the carbon fiber was 1.27 dtex, the degree of variability in the single fiber modulus of elasticity between single fibers was 17.5%, and the roundness was 0.93. Furthermore, the heat amount Ja obtained by heat flux-type differential scanning calorimetry measurement was 168 kJ/kg, and the heat amount Jb was 722 kJ/kg.

Example 8

A carbon fiber bundle was obtained similarly to Example 1, except for setting the coagulation bath concentration of 67% by mass and coagulation bath temperature of 35° C. Upon measuring the strand properties of the obtained carbon fiber bundle, the strand strength was 5.2 GPa and the strand modulus of elasticity was 233 GPa. In addition, the single fiber fineness of the carbon fiber was 1.26 dtex, the degree of variability in the single fiber modulus of elasticity between single fibers was 17.7%, and the roundness was 0.95. Furthermore, the heat amount Ja obtained by heat flux-type differential scanning calorimetry measurement was 163 kJ/kg, and the heat amount Jb was 710 kJ/kg.

Example 9

A carbon fiber bundle was obtained similarly to Example 1, except for copolymerizing under the presence of acrylonitrile, 2-hydroxyethyl methacrylate, ammonium persulfate-ammonium hydrogensulfite and ferric sulfate by way of aqueous suspension polymerization, and setting to acrylonitrile units/2-hydroxyethyl methacrylate units=97.5/2.5 (mol %), and setting to the coagulation bath concentration of 67% by mass and coagulation bath temperature of 45° C. Upon measuring the strand properties of the obtained carbon fiber bundle, the strand strength was 5.2 GPa and the strand modulus of elasticity was 233 GPa. In addition, the single fiber fineness of the carbon fiber was 1.26 dtex, the degree of variability in the single fiber modulus of elasticity between single fibers was 17.8%, and the roundness was 0.98. Furthermore, the heat amount Ja obtained by heat flux-type differential scanning calorimetry measurement was 159 kJ/kg, and the heat amount Jb was 698 kJ/kg.

Example 10

A precursor fiber bundle was obtained by the same method as Example 1 except for obtaining a fiber bundle (swollen line of thread) by discharging the spinning dope into a coagulation bath consisting of dimethylacetoamide aqueous solution of 45% by mass concentration at a temperature of 35° C., through a spinneret with 36,000 holes and a hole diameter of 60 μm (spinning nozzle), and receiving at a rate 0.45 times the discharge linear velocity from the spinneret. Carbon fibers were obtained similarly to Example 1, except for using this precursor fiber bundle, and setting the flameproofing treatment time of 85 minutes and the flameproofing elongation rate to −4%. Upon measuring the strand properties of the obtained carbon fiber bundle, the strand strength was 5.8 GPa and the strand modulus of elasticity was 235 GPa. In addition, the single fiber fineness of the carbon fiber was 1.04 dtex, the degree of variability in the single fiber modulus of elasticity between single fibers was 11.6%, and the roundness was 0.82. Furthermore, the heat amount Ja obtained by heat flux-type differential scanning calorimetry measurement was 190 kJ/kg, and the heat amount Jb was 745 kJ/kg.

Example 11

A precursor fiber bundle was obtained by the same method as Example 1 except for obtaining a fiber bundle (swollen line of thread) by discharging the spinning dope into a coagulation bath consisting of dimethylacetoamide aqueous solution of 45% by mass concentration at a temperature of 35° C., through a spinneret with 24,000 holes and a hole diameter of 60 μm (spinning nozzle), and receiving at a rate 0.40 times the discharge linear velocity from the spinneret. Carbon fibers were obtained similarly to Example 1, except for using this precursor fiber bundle, and setting the flameproofing treatment time of 85 minutes and the flameproofing elongation rate to −2%. Upon measuring the strand properties of the obtained carbon fiber bundle, the strand strength was 5.7 GPa and the strand modulus of elasticity was 235 GPa. In addition, the single fiber fineness of the carbon fiber was 0.95 dtex, the degree of variability in the single fiber modulus of elasticity between single fibers was 12.2%, and the roundness was 0.82. Furthermore, the heat amount Ja obtained by heat flux-type differential scanning calorimetry measurement was 185 kJ/kg, and the heat amount Jb was 740 kJ/kg.

Example 12

The spinning dope was discharged into a coagulation bath consisting of a dimethylacetoamide aqueous solution of 45% by mass concentration at a temperature of 35° C., and received at a rate 0.35 times the discharge linear velocity of the spinning dope to obtain a fiber bundle (swollen line of thread). Next, this fiber bundle was drawn to 5.3 times simultaneously with water rinsing, was led to a first oil bath tank consisting of an oil-based treatment liquid in which an oil-based composition of amino-modified silicone/polyoxyethylene(6)lauryl ether=91/9 (mass ratio) had been dispersed in water at a concentration of 1.5% by mass, the oil-based treatment liquid was imparted to the fiber bundle, and after temporarily wringing out with a guide, it was successively led to a second oil bath tank consisting of the same composition and concentration as the first oil bath tank to impart the oil-based treatment liquid to the fiber bundle again. This fiber bundle was dried using a heated roller, and dry drawing at 1.7 times was done between heated rollers for which the rotational speed was adjusted to predetermined conditions. The overall draw ratio from the swollen line of thread at this time was 9.0 times. A precursor fiber bundle with a single fiber fineness of 2.3 dtex was obtained by the same method as Example 1 except for this.

Carbon fibers were obtained similarly to Example 1, except for using the above-mentioned precursor fiber bundle, and setting the flameproofing treatment time of 85 minutes and the flameproofing elongation rate to 1.0%. Upon measuring the strand properties of the obtained carbon fiber bundle, the strand strength was 5.4 GPa and the strand modulus of elasticity was 235 GPa. In addition, the single fiber fineness of the carbon fiber was 1.12 dtex, the degree of variability in the single fiber modulus of elasticity between single fibers was 12.8%, and the roundness was 0.82. Furthermore, the heat amount Ja obtained by heat flux-type differential scanning calorimetry measurement was 175 kJ/kg, and the heat amount Jb was 730 kJ/kg.

Example 13

A precursor fiber bundle with a single fiber fineness of 3.5 dtex was obtained similarly to Example 1 except for discharging the spinning dope into a coagulation bath consisting of dimethylacetoamide aqueous solution of 45% by mass concentration at a temperature of 35° C., through a spinneret with 15,000 holes and a hole diameter of 60 μm (spinning nozzle), and receiving at a rate 0.23 times the discharge linear velocity from the spinneret.

The above-mentioned precursor fiber bundle was subjected to flameproofing treatment under a temperature distribution of 220 to 260° C. for 240 minutes at an elongation rate of 5.0% to obtain a flameproof fiber bundle. The obtained flameproof fiber bundle was further pre-carbonization treated for 2.7 minutes under a nitrogen atmosphere at 700° C. with an elongation rate of 3.0%, then carbonization treated for 2.5 minutes in a nitrogen atmosphere at 1,300° C. with an elongation rate of −3.5%. Upon measuring the strand properties of the obtained carbon fiber bundle, the strand strength was 5.1 GPa and the strand modulus of elasticity was 235 GPa. In addition, the single fiber fineness of the carbon fiber was 1.69 dtex, the degree of variability in the single fiber modulus of elasticity between single fibers was 18.5%, and the roundness was 0.84. Furthermore, the heat amount Ja obtained by heat flux-type differential scanning calorimetry measurement was 150 kJ/kg, and the heat amount Jb was 690 kJ/kg.

Example 14

Carbon fiber was obtained similarly to Example 1, except for setting a flameproofing treatment time of 160 minutes and the flameproofing elongation rate to 5.0%. Upon measuring the strand properties of the obtained carbon fiber bundle, the strand strength was 5.2 GPa and the strand modulus of elasticity was 235 GPa. In addition, the single fiber fineness of the carbon fiber was 1.27 dtex, the degree of variability in the single fiber modulus of elasticity between single fibers was 11.3%, and the roundness was 0.82. Furthermore, the heat amount Ja obtained by heat flux-type differential scanning calorimetry measurement was 170 kJ/kg, and the heat amount Jb was 725 kJ/kg.

Example 15

Carbon fiber was obtained similarly to Example 1, except for setting a flameproofing treatment time of 240 minutes and the flameproofing elongation rate to 5.0%. Upon measuring the strand properties of the obtained carbon fiber bundle, the strand strength was 5.3 GPa and the strand modulus of elasticity was 238 GPa. In addition, the single fiber fineness of the carbon fiber was 1.27 dtex, the degree of variability in the single fiber modulus of elasticity between single fibers was 9.5%, and the roundness was 0.85. Furthermore, the heat amount Ja obtained by heat flux-type differential scanning calorimetry measurement was 170 kJ/kg, and the heat amount Jb was 725 kJ/kg.

Example 16

A carbon fiber bundle was obtained similarly to Example 1, except for copolymerizing under the presence of acrylonitrile, 2-hydroxyethyl acrylate, ammonium persulfate-ammonium hydrogensulfite and ferric sulfate by way of aqueous suspension polymerization, and setting to acrylonitrile units/2-hydroxyethyl acrylate units=98.5/1.5 (mol %). Upon measuring the strand properties of the obtained carbon fiber bundle, the strand strength was 5.2 GPa and the strand modulus of elasticity was 233 GPa. In addition, the single fiber fineness of the carbon fiber was 1.26 dtex, the degree of variability in the single fiber modulus of elasticity between single fibers was 18.2%, and the roundness was 0.85. Furthermore, the heat amount Ja obtained by heat flux-type differential scanning calorimetry measurement was 198 kJ/kg, and the heat amount Jb was 850 kJ/kg.

Example 17

A carbon fiber bundle was obtained similarly to Example 1, except for setting the flameproofing elongation rate to −6.0%. Upon measuring the strand properties of the obtained carbon fiber bundle, the strand strength was 4.9 GPa and the strand modulus of elasticity was 230 GPa. In addition, the single fiber fineness of the carbon fiber was 1.41 dtex, the degree of variability in the single fiber modulus of elasticity between single fibers was 16.8%, and the roundness was 0.82. Furthermore, the heat amount Ja obtained by heat flux-type differential scanning calorimetry measurement was 170 kJ/kg, and the heat amount Jb was 725 kJ/kg.

Example 18

Carbon fiber was produced by the same method as Example 1 except for obtaining a fiber bundle (swollen line of thread) by discharging the spinning dope into a coagulation bath consisting of dimethylacetoamide aqueous solution of 45% by mass concentration at a temperature of 35° C., through a spinneret with 40,000 holes and a hole diameter of 60 μm (spinning nozzle), and receiving at a rate 0.32 times the discharge linear velocity from the spinneret. Upon measuring the strand properties of the obtained carbon fiber bundle, the strand strength was 4.9 GPa and the strand modulus of elasticity was 225 GPa. In addition, the single fiber fineness of the carbon fiber was 1.27 dtex, the degree of variability in the single fiber modulus of elasticity between single fibers was 26.3%, and the roundness was 0.83. Furthermore, the heat amount Ja obtained by heat flux-type differential scanning calorimetry measurement was 170 kJ/kg, and the heat amount Jb was 725 kJ/kg.

Comparative Example 1

A carbon fiber bundle was obtained similarly to Example 1, except for setting the flameproofing treatment time to 70 minutes and the flameproofing elongation rate to 5.0%. Upon measuring the strand properties of the obtained carbon fiber bundle, the strand strength was 4.2 GPa and the strand modulus of elasticity was 232 GPa. In addition, the single fiber fineness of the carbon fiber was 1.27 dtex, the degree of variability in the single fiber modulus of elasticity between single fibers was 23.2%, and the roundness was 0.82. Furthermore, the heat amount Ja obtained by heat flux-type differential scanning calorimetry measurement was 170 kJ/kg, and the heat amount Jb was 725 kJ/kg.

Comparative Example 2

An acrylonitrile-based copolymer consisting of acrylonitrile units/acrylamide units/methacrylate units=96/3/1 (mol %) was obtained by copolymerizing acrylonitrile, acrylamide and methacrylic acid under the presence of ammonium persulfate-ammonium hydrogensulfite and ferric sulfate by way of aqueous suspension polymerization. This polyacrylonitrile-based copolymer was dissolved in dimethylacetoamide to prepare a 21% by mass spinning dope. Through a spinneret with 24,000 holes and a hole diameter of 60 μm (spinning nozzle), it was discharged into a coagulation bath consisting of a dimethylacetoamide aqueous solution of 60% by mass concentration at a temperature of 35° C., and received at a rate 0.32 times the discharge linear velocity from the spinneret to obtain a fiber bundle (swollen line of thread). Next, this fiber bundle was drawn to 5.4 times simultaneously with water rinsing, was led to a first oil bath tank consisting of an oil-based treatment liquid in which an oil-based composition of amino-modified silicone/polyoxyethylene(6)lauryl ether=91/9 (mass ratio) had been dispersed in water at a concentration of 1.5% by mass, the oil-based treatment liquid was imparted to the fiber bundle, and after temporarily wringing out with a guide, it was successively led to a second oil bath tank consisting of the same composition and concentration as the first oil bath tank to impart the oil-based treatment liquid to the fiber bundle again. The fiber bundle imparted with the oil-based treatment liquid again was dried using a heated roller, and dry drawing at 1.3 times was done between heated rollers for which the rotational speed was adjusted to predetermined conditions. The overall draw ratio from the swollen line of thread at this time was 7.3 times. Subsequently, the moisture percentage was adjusted by imparting water to the fiber bundle with a touch roller to obtain a precursor fiber bundle with a single fiber fineness of 2.5 dtex.

The above-mentioned precursor fiber bundle was subjected to flameproofing treatment under a temperature distribution of 220 to 260° C. for 300 minutes at an elongation rate of 5.0% to obtain a flameproof fiber bundle. The obtained flameproof fiber bundle was further pre-carbonization treated for 3.7 minutes under a nitrogen atmosphere at 700° C. with an elongation rate of 3.0%, then carbonization treated for 3.2 minutes in a nitrogen atmosphere at 1,300° C. with an elongation rate of −4.0%. A carbon fiber bundle was obtained similarly to Example 1 except for these. Upon measuring the strand properties of the obtained carbon fiber bundle, the strand strength was 3.8 GPa and the strand modulus of elasticity was 231 GPa. In addition, the single fiber fineness of the carbon fiber was 1.37 dtex, the degree of variability in the single fiber modulus of elasticity between single fibers was 27.0%, and the roundness was 0.85. Furthermore, the heat amount Ja obtained by heat flux-type differential scanning calorimetry measurement was 190 kJ/kg, and the heat amount Jb was 1151 kJ/kg.

Comparative Example 3

A carbon fiber bundle was obtained similarly to Example 13, except for flameproofing treating under a temperature distribution of 220 to 260° C. for 70 minutes at an elongation rate of 5.0%. Upon measuring the strand properties of the obtained carbon fiber bundle, the strand strength was 3.8 GPa and the strand modulus of elasticity was 235 GPa. In addition, the single fiber fineness of the carbon fiber was 1.75 dtex, the degree of variability in the single fiber modulus of elasticity between single fibers was 25.1%, and the roundness was 0.82. Furthermore, the heat amount Ja obtained by heat flux-type differential scanning calorimetry measurement was 150 kJ/kg, and the heat amount Jb was 690 kJ/kg.

Comparative Example 4

A precursor fiber bundle with a single fiber fineness of 4.5 dtex was obtained similarly to Example 1, except for discharging the spinning dope into a coagulation bath consisting of dimethylacetoamide aqueous solution of 45% by mass concentration at a temperature of 35° C., through a spinneret with 12,000 holes and a hole diameter of 60 μm (spinning nozzle), and receiving at a rate 0.18 times the discharge linear velocity from the spinneret.

The above-mentioned precursor fiber bundle was subjected to flameproofing treatment under a temperature distribution of 220 to 260° C. for 240 minutes at an elongation rate of 5.0% to obtain a flameproof fiber bundle. The obtained flameproof fiber bundle was further pre-carbonization treated for 3.7 minutes under a nitrogen atmosphere at 700° C. with an elongation rate of 3.0%, then carbonization treated for 3.2 minutes in a nitrogen atmosphere at 1,300° C. with an elongation rate of −4.0%. Upon measuring the strand properties of the obtained carbon fiber bundle, the strand strength was 3.5 GPa and the strand modulus of elasticity was 230 GPa. In addition, the single fiber fineness of the carbon fiber was 2.43 dtex, the degree of variability in the single fiber modulus of elasticity between single fibers was 18.3%, and the roundness was 0.82. Furthermore, the heat amount Ja obtained by heat flux-type differential scanning calorimetry measurement was 135 kJ/kg, and the heat amount Jb was 660 kJ/kg.

Comparative Example 5

A carbon fiber bundle was obtained similarly to Example 1, except for copolymerizing under the presence of acrylonitrile, 2-hydroxyethyl methacrylate, ammonium-persulfate-ammonium hydrogensulfite and ferric sulfate by way of aqueous suspension polymerization, and establishing acrylonitrile units/2-hydroxyethyl methacrylate units=95/5 (mol %). Upon measuring the strand properties of the obtained carbon fiber bundle, the strand strength was 4.0 GPa and the strand modulus of elasticity was 229 GPa. In addition, the single fiber fineness of the carbon fiber was 1.21 dtex, the degree of variability in the single fiber modulus of elasticity between single fibers was 9.2%, and the roundness was 0.82. Furthermore, the heat amount Ja obtained by heat flux-type differential scanning calorimetry measurement was 139 kJ/kg, and the heat amount Jb was 650 kJ/kg.

Example 19

Carbon fiber was obtained similarly to Example 1, except for subjecting a precursor fiber bundle with a single fiber fineness of 2.5 dtex produced by the same method as Example 1 to carbonization treatment for 2.0 minutes in a carbonization furnace (first carbonization furnace) with a nitrogen atmosphere and a highest temperature of 1,600° C. at an elongation rate of −3.8%, and then subjecting to second carbonization treatment for 2.0 minutes in a carbonization furnace (second carbonization furnace) with a nitrogen atmosphere and a highest temperature of 2,400° C. at an elongation rate of −3.8%. Upon measuring the strand properties of the obtained carbon fiber bundle, the strand strength was 3.7 GPa and the strand modulus of elasticity was 343 GPa. In addition, the single fiber fineness of the carbon fiber was 1.17 dtex, the degree of variability in the single fiber modulus of elasticity between single fibers was 17.0%, and the roundness was 0.82.

Example 20

Carbon fiber was obtained similarly to Example 19, using a precursor fiber bundle with a single fiber fineness of 3.5 dtex produced by the same method as Example 13. Upon measuring the strand properties of the obtained carbon fiber bundle, the strand strength was 3.4 GPa and the strand modulus of elasticity was 314 GPa. In addition, the single fiber fineness of the carbon fiber was 1.60 dtex, the degree of variability in the single fiber modulus of elasticity between single fibers was 18.8%, and the roundness was 0.84.

Example 21

Carbon fiber was obtained similarly to Example 19, using a precursor fiber bundle with a single fiber fineness of 4.5 dtex produced by the same method as Comparative Example 4. Upon measuring the strand properties of the obtained carbon fiber bundle, the strand strength was 3.0 GPa and the strand modulus of elasticity was 294 GPa. In addition, the single fiber fineness of the carbon fiber was 2.26 dtex, the degree of variability in the single fiber modulus of elasticity between single fibers was 19.1%, and the roundness was 0.85.

Example 22

Carbon fiber was obtained similarly to Example 1, except for subjecting the precursor fiber bundle with a single fiber fineness of 2.5 dtex produced by the same method as Example 1 to carbonization treatment for 2.0 minutes in a carbonization furnace (first carbonization furnace) with a nitrogen atmosphere and a highest temperature of 1,500° C. at an elongation rate of −3.8%, and then subjecting to second carbonization treatment for 2.0 minutes in a carbonization furnace (second carbonization furnace) with a nitrogen atmosphere and a highest temperature of 1,800° C. at an elongation rate of −3.8%. Upon measuring the strand properties of the obtained carbon fiber bundle, the strand strength was 4.0 GPa and the strand modulus of elasticity was 290 GPa. In addition, the single fiber fineness of the carbon fiber was 1.21 dtex, the degree of variability in the single fiber modulus of elasticity between single fibers was 17.5%, and the roundness was 0.82.

The results of strand properties of the obtained carbon fiber bundles are shown in Tables 1, 2 and 3 along with the test conditions.

TABLE 1

| | Example 1 | Example 2 | Example 3 | Example 4 | Example 5 | Example 6 | Example 7 | Example 8 | Example 9 |
|---|---|---|---|---|---|---|---|---|---|
| Precursor fiber fineness (dtex) | 2.5 | 2.5 | 2.5 | 2.5 | 2.5 | 2.5 | 2.5 | 2.5 | 2.5 |
| Thread number of precursor fiber bundles | 24,000 | 24,000 | 24,000 | 24,000 | 24,000 | 24,000 | 24,000 | 24,000 | 24,000 |
| Acrylonitrile (mol %) | 98.5 | 98.0 | 98.5 | 98.5 | 98 | 98 | 98.5 | 98.5 | 97.5 |
| 2-hydroxyethyl methacrylate (mol %) | 1.5 | 2.0 | 1.5 | 1.5 | 2.0 | 2.0 | 1.5 | 1.5 | 2.5 |
| Acrylamide (mol %) | — | — | — | — | — | — | — | — | — |
| Methacrylic acid (mol %) | — | — | — | — | — | — | — | — | — |

TABLE 1-continued

| | | | | | | | | | |
|---|---|---|---|---|---|---|---|---|---|
| 2-hydroxyethyl acrylate (mol %) | — | — | — | — | — | — | — | — | — |
| Coagulation bath concentration (Mass %) | 45 | 45 | 45 | 45 | 50 | 50 | 60 | 67 | 67 |
| Coagulation bath temperature (° C.) | 35 | 35 | 35 | 25 | 35 | 40 | 45 | 35 | 45 |
| Flameproofing time (min) | 107 | 107 | 107 | 100 | 107 | 107 | 107 | 107 | 107 |
| Flameproofing elongation rate (%) | 5.0 | 5.0 | 5.0 | 5.0 | 5.0 | 5.0 | 5.0 | 5.0 | 5.0 |
| Carbonization temperature (° C.) | 1,300 | 1,300 | 1,550 | 1,300 | 1,300 | 1,300 | 1,300 | 1,300 | 1,300 |
| Areal weight of carbon fiber bundle (g/m) | 3.04 | 3.03 | 2.90 | 3.04 | 3.04 | 3.03 | 3.04 | 3.03 | 3.02 |
| Density of carbon fiber bundle (g/cm$^3$) | 1.81 | 1.81 | 1.79 | 1.81 | 1.81 | 1.81 | 1.81 | 1.81 | 1.81 |
| Circularity | 0.82 | 0.82 | 0.82 | 0.79 | 0.86 | 0.88 | 0.93 | 0.95 | 0.98 |
| Carbon fiber single fiber fineness (dtex) | 1.27 | 1.26 | 1.21 | 1.27 | 1.27 | 1.26 | 1.27 | 1.26 | 1.26 |
| Strand strength (GPa) | 5.3 | 5.2 | 5.1 | 5.3 | 5.3 | 5.2 | 5.2 | 5.2 | 5.2 |
| Strand modulus of elasticity (GPa) | 233 | 233 | 256 | 233 | 232 | 233 | 233 | 233 | 233 |
| Modulus of elasticity degree of variability between fibers (%) | 16.5 | 13.3 | 17.2 | 15.2 | 17.0 | 17.3 | 17.5 | 17.7 | 17.8 |
| Heat flux-type differential scanning calorimeter Ja | 170 | 168 | 170 | 175 | 170 | 172 | 168 | 163 | 159 |
| Heat flux-type differential scanning calorimeter Jb | 725 | 722 | 725 | 740 | 725 | 727 | 722 | 710 | 698 |

| | Example 10 | Example 11 | Example 12 | Example 13 | Example 14 | Example 15 | Example 16 | Example 17 | Example 18 |
|---|---|---|---|---|---|---|---|---|---|
| Precursor fiber fineness (dtex) | 1.8 | 2.0 | 2.3 | 3.5 | 2.5 | 2.5 | 2.5 | 2.5 | 2.5 |
| Thread number of precursor fiber bundles | 36,000 | 24,000 | 24,000 | 15,000 | 24,000 | 24,000 | 24,000 | 24,000 | 40,000 |
| Acrylonitrile (mol %) | 98.5 | 98.5 | 98.5 | 98.5 | 98.5 | 98.5 | 98.5 | 98.5 | 98.5 |
| 2-hydroxyethyl methacrylate (mol %) | 1.5 | 1.5 | 1.5 | 1.5 | 1.5 | 1.5 | — | 1.5 | 1.5 |
| Acrylamide (mol %) | — | — | — | — | — | — | — | — | — |
| Methacrylic acid (mol %) | — | — | — | — | — | — | — | — | — |
| 2-hydroxyethyl acrylate (mol %) | — | — | — | — | — | — | 1.5 | — | — |
| Coagulation bath concentration (Mass %) | 45 | 45 | 45 | 45 | 45 | 45 | 45 | 45 | 45 |
| Coagulation bath temperature (° C.) | 35 | 35 | 35 | 35 | 35 | 35 | 35 | 35 | 35 |
| Flameproofing time (min) | 85 | 85 | 85 | 240 | 160 | 240 | 107 | 107 | 107 |
| Flameproofing elongation rate (%) | −4.0 | −2.0 | 1.0 | 5.0 | 5.0 | 5.0 | 5.0 | −6.0 | 5.0 |
| Carbonization temperature (° C.) | 1,300 | 1,300 | 1,300 | 1,300 | 1,300 | 1,300 | 1,300 | 1,300 | 1,300 |
| Areal weight of carbon fiber bundle (g/m) | 3.73 | 2.27 | 2.68 | 2.54 | 3.05 | 3.05 | 3.03 | 3.38 | 5.07 |
| Density of carbon fiber bundle (g/cm$^3$) | 1.81 | 1.81 | 1.81 | 1.81 | 1.81 | 1.81 | 1.81 | 1.81 | 1.81 |
| Circularity | 0.82 | 0.82 | 0.82 | 0.84 | 0.82 | 0.85 | 0.85 | 0.82 | 0.83 |
| Carbon fiber single fiber fineness (dtex) | 1.04 | 0.95 | 1.12 | 1.69 | 1.27 | 1.27 | 1.26 | 1.41 | 1.27 |
| Strand strength (GPa) | 5.8 | 5.7 | 5.4 | 5.1 | 5.2 | 5.3 | 5.2 | 4.9 | 4.9 |
| Strand modulus of elasticity (GPa) | 235 | 235 | 235 | 235 | 235 | 238 | 233 | 230 | 225 |
| Modulus of elasticity degree of variability between fibers (%) | 11.6 | 12.2 | 12.8 | 18.5 | 11.3 | 9.5 | 18.2 | 16.8 | 26.3 |
| Heat flux-type differential scanning calorimeter Ja | 190 | 185 | 175 | 150 | 170 | 170 | 198 | 170 | 170 |
| Heat flux-type differential scanning calorimeter Jb | 745 | 740 | 730 | 690 | 725 | 725 | 850 | 725 | 725 |

TABLE 2

| | Comparative Example 1 | Comparative Example 2 | Comparative Example 3 | Comparative Example 4 | Comparative Example 5 |
|---|---|---|---|---|---|
| Precursor fiber fineness (dtex) | 2.5 | 2.5 | 3.5 | 4.5 | 2.5 |
| Thread number of precursor fiber bundles | 24,000 | 24,000 | 15,000 | 12,000 | 24,000 |

TABLE 2-continued

| | Comparative Example 1 | Comparative Example 2 | Comparative Example 3 | Comparative Example 4 | Comparative Example 5 |
|---|---|---|---|---|---|
| Acrylonitrile (mol %) | 98.5 | 96.0 | 98.5 | 98.5 | 95.0 |
| 2-hydroxyethyl methacrylate (mol %) | 1.5 | — | 1.5 | 1.5 | 5.0 |
| Acrylamide (mol %) | — | 3.0 | — | — | — |
| Methacrylic acid (mol %) | — | 1.0 | — | — | — |
| Coagulation bath concentration (Mass %) | 45 | 60 | 45 | 45 | 45 |
| Coagulation bath temperature (° C.) | 35 | 35 | 35 | 35 | 35 |
| Flameproofing time (min) | 70 | 300 | 70 | 240 | 107 |
| Flameproofing elongation rate (%) | 5.0 | 5.0 | 5.0 | 5.0 | 5.0 |
| Carbonization temperature (° C.) | 1,300 | 1,300 | 1,300 | 1,300 | 1,300 |
| Areal weight of carbon fiber bundle (g/m) | 3.04 | 3.29 | 2.62 | 2.91 | 2.9 |
| Density of carbon fiber bundle ($g/cm^3$) | 1.81 | 1.82 | 1.81 | 1.82 | 1.81 |
| Circularity | 0.82 | 0.85 | 0.82 | 0.82 | 0.82 |
| Carbon fiber single fiber fineness (dtex) | 1.27 | 1.37 | 1.75 | 2.43 | 1.21 |
| Strand strength (GPa) | 4.2 | 3.8 | 3.8 | 3.5 | 4.0 |
| Strand modulus of elasticity (GPa) | 232 | 231 | 235 | 230 | 229 |
| Modulus of elasticity degree of variability between fibers (%) | 23.2 | 27.0 | 25.1 | 18.3 | 9.2 |
| Heat flux-type differential scanning calorimeter Ja (kJ/kg) | 170 | 190 | 150 | 135 | 139 |
| Heat flux-type differential scanning calorimeter Jb (kJ/kg) | 725 | 1151 | 690 | 660 | 650 |

TABLE 3

| | Example 19 | Example 20 | Example 21 | Example 22 |
|---|---|---|---|---|
| Precursor fiber fineness (dtex) | 2.5 | 3.5 | 4.5 | 2.5 |
| Thread number of precursor fiber bundles | 24,000 | 15,000 | 12,000 | 24,000 |
| Acrylonitrile (mol %) | 98.5 | 98.5 | 98.5 | 98.5 |
| 2-hydroxyethyl methacrylate (mol %) | 1.5 | 1.5 | 1.5 | 1.5 |
| First carbonization furnace highest temperature (° C.) | 1,600 | 1,600 | 1,600 | 1,500 |
| Second carbonization furnace highest temperature (° C.) | 2,400 | 2,400 | 2,400 | 1,800 |
| Areal weight of carbon fiber bundle (g/m) | 2.80 | 2.40 | 2.71 | 2.90 |
| Density of carbon fiber bundle ($g/cm^3$) | 1.85 | 1.85 | 1.85 | 1.83 |
| Circularity | 0.82 | 0.84 | 0.85 | 0.82 |
| Carbon fiber single fiber fineness (dtex) | 1.17 | 1.60 | 2.26 | 1.21 |
| Strand strength (GPa) | 3.7 | 3.4 | 3.0 | 4.0 |
| Strand modulus of elasticity (GPa) | 343 | 314 | 294 | 290 |
| Modulus of elasticity degree of variability between fibers (%) | 17.0 | 18.8 | 19.1 | 17.5 |

The invention claimed is:

1. A carbon fiber bundle, wherein

- a single fiber fineness of the carbon fiber bundle is at least 0.8 dtex to no more than 2.1 dtex;
- a strand strength of at least 4.9 GPa and a strand modulus of elasticity of at least 200 GP is determined by a method of ASTM D4018; and
- a degree of variability between fibers in a single fiber modulus of elasticity in a single fiber tension test is no more than 20%, wherein the degree of variability is calculated by the formula below:

Degree of variability (%)=(standard deviation/average value)×100.

2. The carbon fiber bundle according to claim 1, wherein the single fiber fineness is at least 1.1 dtex.

3. The carbon fiber bundle according to claim 1, wherein a total fineness is at least 4800 dtex to no more than 56000 dtex.

4. The carbon fiber bundle according to claim 1, wherein a number of the single fibers is at least 6,000 to no more than 50,000.

5. The carbon fiber bundle according to claim 4, wherein the number of the single fibers is no more than 36,000.

6. A resin-based composite material comprising the carbon fiber bundle according to claim 1.

7. A method of producing carbon fiber bundles for obtaining the carbon fiber bundle according to claim 1, comprising a heat treatment step of heat treating, for at least 80 minutes to no more than 240 minutes under an oxidizing atmosphere rising in temperature within the temperature range of 220 to 300° C., a polyacrylonitrile-based precursor fiber bundle having a single fiber fineness of at least 1.7 dtex to no more than 4.2 dtex consisting of a polyacrylonitrile-based copolymer containing 96 to 99% by mole of acrylonitrile units and 1 to 4% by mole of hydroxyaklyl methacrylate units, and/or a polyacrylonitrile-based precursor fiber bundle having a single fiber fineness of at least 1.7 dtex to no more than 4.2 dtex having a constant velocity temperature rising exothermic curve of 30° C. to 450° C. measured in an air flow of 100 ml/min that is a flowrate based on 30° C. at 0.10 MPa and at a heating rate of 10° C./min using a heat flux-type differential scanning calorimeter that satisfies conditions (A) and (B) below:

(A) heat amount Ja obtained by integrating the heat generation rate of at least 230° C. to no higher than 260° C. of a constant velocity temperature rising exothermic curve is at least 140 kJ/kg to no more than 200 kJ/kg; and (B) heat amount Jb obtained by integrating the heat generation rate of at least 260° C. to no higher than 290° C. is at least 600 kJ/kg to no more than 1,000 kJ/kg.

8. The method of producing carbon fiber bundles according to claim 7, wherein a heat treatment time T1 (minutes) in the heat treatment step satisfies condition (C) below:

(C) 140×single fiber fineness (dtex) of polyacrylonitrile-based precursor fiber bundle−100≥heat treatment time T1 (minutes)≥140×single fiber fineness (dtex) of polyacrylonitrile-based precursor fiber bundle−270.

9. The method of producing carbon fiber bundles according to claim 7, wherein a carbonization treatment is conducted to heat treat the fiber bundle obtained from the heat treatment step at a highest temperature of 1,000° C. to 1,700° C. under an inert gas atmosphere, so as to make a carbon fiber bundle having a strand strength obtained by the method of ASTM D4018 of at least 4.9 GPa.

10. The method of producing carbon fiber bundles according to claim 7, wherein a number of single fibers in the polyacrylonitrile-based precursor fiber bundle is at least 6,000 to no more than 50,000.

11. The method of producing carbon fiber bundles according to claim 7, wherein an elongation rate of polyacrylonitrile-based precursor fiber bundles in the heat treatment step is at least −5% to no more than 5%.

12. A carbon fiber bundle, wherein a single fiber fineness of the carbon fiber bundle is at least 0.8 dtex to no more than 2.5 dtex, a strand strength obtained by the method of ASTM D4018 is at least 3.0 GPa, and a strand modulus of elasticity obtained by the method is at least 240 GPa, and wherein a degree of variability between fibers in a single fiber modulus of elasticity in a single fiber tension test is no more than 20%, wherein the degree of variability is calculated by the formula below:

Degree of variability (%)=(standard deviation/average value)×100.

13. The carbon fiber bundle according to claim 12, wherein the strand modulus of elasticity obtained by the method of ASTM D4018 is at least 265 GPa.

14. The carbon fiber bundle according to claim 12, wherein the single fiber fineness is at least 1.1 dtex.

15. The carbon fiber bundle according to claim 12, wherein the total fineness is at least 4800 dtex to no more than 56000 dtex.

16. The carbon fiber bundle according to claim 12, wherein the number of single fibers is at least 6,000 to no more than 50,000.

17. The carbon fiber bundle according to claim 16, wherein the number of single fibers is no more than 36,000.

18. A resin-based composite material comprising the carbon fiber bundle according to claim 12.

19. A method of producing carbon fiber bundles for obtaining the carbon fiber bundle according to claim 12, comprising:

a heat treatment step of heat treating, for at least 80 minutes to no more than 240 minutes under an oxidizing atmosphere rising in temperature within the temperature range of 220 to 300° C., a polyacrylonitrile-based precursor fiber bundle having a single fiber fineness of at least 1.7 dtex to no more than 4.6 dtex consisting of a polyacrylonitrile-based copolymer containing 96 to 99% by mole of acrylonitrile units and 1 to 4% by mole of hydroxyaklyl methacrylate units, and/or a polyacrylonitrile-based precursor fiber bundle having a single fiber fineness of at least 1.7 dtex to no more than 4.6 dtex having a constant velocity temperature rising exothermic curve of 30° C. to 450° C. measured in an air flow of 100 ml/min that is a flowrate based on 30° C. at 0.10 MPa and at a heating rate of 10° C./min using a heat flux-type differential scanning calorimeter that satisfies conditions (A) and (B) below:

(A) heat amount Ja obtained by integrating the heat generation rate of at least 230° C. to no higher than 260° C. of a constant velocity temperature rising exothermic curve is at least 140 kJ/kg to no more than 200 kJ/kg;

(B) heat amount Jb obtained by integrating the heat generation rate of at least 260° C. to no higher than 290° C. is at least 600 kJ/kg to no more than 1,000 kJ/kg; and a step of conducting carbonization treatment to heat treat the fiber bundle obtained from the heat treatment step at a highest temperature of at least 1,500° C. under an inert gas atmosphere, so as to make a carbon fiber bundle having a strand modulus of elasticity obtained by the method of ASTM D4018 of at least 240 GPa.

20. The method of producing carbon fiber bundles according to claim 19, wherein the highest temperature is at least 1,800° C.

21. The method of producing carbon fiber bundles according to claim 19, wherein a number of single fibers in the polyacrylonitrile-based precursor fiber bundle is at least 6,000 to no more than 50,000.

22. The method of producing carbon fiber bundles according to claim 19, wherein an elongation rate of polyacrylonitrile-based precursor fiber bundles in the heat treatment step is at least −5% to no more than 5%.

* * * * *